United States Patent
Schäfer et al.

(10) Patent No.: US 11,639,018 B2
(45) Date of Patent: May 2, 2023

(54) METHOD AND DEVICE FOR CLEANING A POLYMER MELT

(71) Applicant: BB Engineering GmbH, Remscheid (DE)

(72) Inventors: Klaus Schäfer, Remscheid (DE); Jörg Alexander, Remscheid (DE); Friedel Dickmeiss, Langenfeld (DE); Matthias Schmitz, Cologne (DE)

(73) Assignee: BB Engineering GmbH, Remscheid (DE)

( * ) Notice: Subject to any disclaimer, the term of this patent is extended or adjusted under 35 U.S.C. 154(b) by 257 days.

(21) Appl. No.: 16/641,902

(22) PCT Filed: Sep. 3, 2018

(86) PCT No.: PCT/EP2018/073561
§ 371 (c)(1),
(2) Date: Feb. 25, 2020

(87) PCT Pub. No.: WO2019/048364
PCT Pub. Date: Mar. 14, 2019

(65) Prior Publication Data
US 2020/0198210 A1 Jun. 25, 2020

(30) Foreign Application Priority Data
Sep. 5, 2017 (DE) .................... 10 2017 008 320.7

(51) Int. Cl.
| | | |
|---|---|---|
| *B29C 48/694* | (2019.01) | |
| *D01D 1/10* | (2006.01) | |
| *B29C 48/693* | (2019.01) | |
| *B29C 48/76* | (2019.01) | |
| *B29C 48/255* | (2019.01) | |
| *B01D 29/52* | (2006.01) | |
| *B29B 13/10* | (2006.01) | |

(52) U.S. Cl.
CPC .......... *B29C 48/694* (2019.02); *D01D 1/106* (2013.01); *B01D 29/52* (2013.01); *B29B 13/10* (2013.01); *B29C 48/2554* (2019.02); *B29C 48/693* (2019.02); *B29C 48/76* (2019.02)

(58) Field of Classification Search
None
See application file for complete search history.

(56) References Cited

FOREIGN PATENT DOCUMENTS

| | | |
|---|---|---|
| CN | 107053635 | 8/2017 |
| DE | 231029 | 12/1985 |
| DE | 19912433 | 9/1999 |
| EP | 0705677 | 4/1996 |

(Continued)

OTHER PUBLICATIONS

Lechler EP2439044 2012 English Translation (Year: 2012).*

*Primary Examiner* — Jacob T Minskey
*Assistant Examiner* — Adrien J Bernard
(74) *Attorney, Agent, or Firm* — BainwoodHuang

(57) ABSTRACT

Techniques involve cleaning a polymer melt, which allow volatile foreign substances and solid foreign substances to be removed from the polymer melt. Such techniques involve a filter element and a vacuum of a vacuum chamber. The polymer melt is fed through the filter element into the vacuum of the vacuum chamber, The filter element binds the solid foreign substances and the vacuum chamber takes up the volatile foreign substances.

17 Claims, 4 Drawing Sheets

(56) References Cited

FOREIGN PATENT DOCUMENTS

Figure 1:
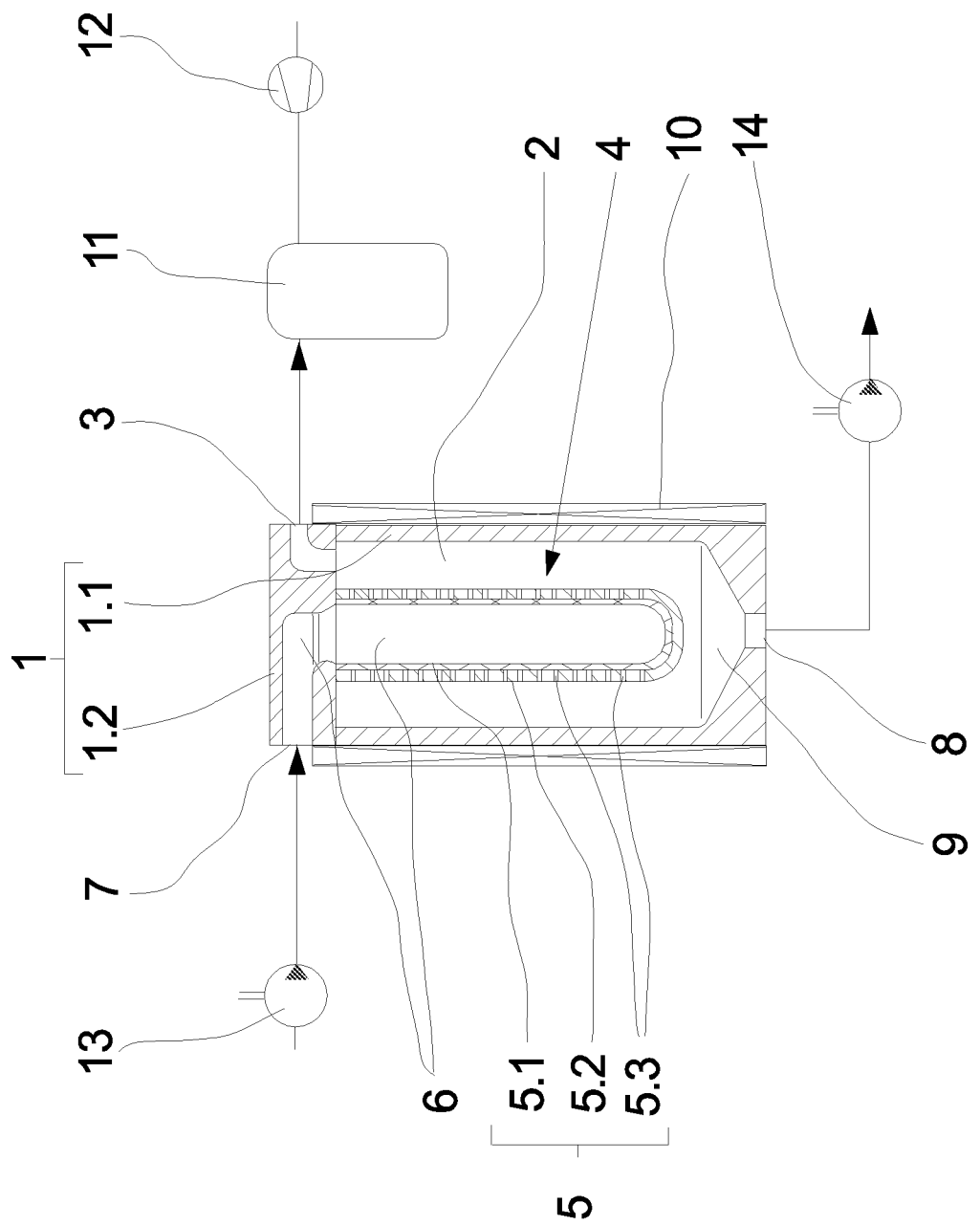

| | | |
|---|---|---|
| EP | 1400337 | 3/2004 |
| EP | 2008784 | 12/2008 |
| EP | 2439044 | 4/2012 |
| WO | 2005087477 | 9/2005 |

* cited by examiner

METHOD AND DEVICE FOR CLEANING A POLYMER MELT

The invention relates to a method for cleaning a polymer melt as disclosed herein and to a device for cleaning a polymer melt as disclosed herein.

In the processing of thermoplastic plastics materials, it is generally known that, in the case of an extrusion process, for example for producing products in the form of strands, the polymer melt must largely be cleaned of foreign substances. For example, some thermoplastic plastics materials contain certain amounts of monomers, oligomers, solvents and other volatile constituents as residues of the production process. Other polymers, such as, for example, polyamide, are very hygroscopic, so that they have a pronounced tendency to take up water. The moisture that is taken up can be enclosed or absorbed within the polymer. In addition, during the melting of polymers in granular form, large amounts of air are incorporated into the melt. These constituents are here referred to as volatile foreign substances.

However, in addition to the volatile foreign substances, contaminants of the polymer melt which are referred to here as solid foreign substances also occur. Such solid foreign substances are impurities which are contained in the granules, for example, or originate from machine parts as dust from abrasion. However, decomposition products additionally also occur within the melt, which decomposition products, in the case of fiber production, for example, can lead to undesirable thread breakages.

It is conventional in the prior art to carry out cleaning of the polymer melt in a plurality of process steps. In order to free the polymer melt of volatile foreign substances, it is conventional the degas the polymer melt. The melt surface of the polymer melt is thereby brought into contact with a vacuum, so that the volatile constituents are able to separate from the melt. This operation is preferably carried out directly during extrusion of the polymer melt by extruders, as is disclosed, for example, in EP 1 400 337 B1. A degassing zone is thereby formed in a screw portion of a screw extruder, which degassing zone generates a vacuum in the extruder portion.

For removing the solid foreign substances, the polymer melt is filtered by means of filter elements. This process step is conventionally carried out by means of filter devices, as is known, for example, from DE 199 12 433 A1. The polymer melt is thereby guided through a filter element which, in dependence on a filter fineness, filters the solid foreign substances from the melt stream of the polymer melt.

Many variants of such methods and devices for degassing the polymer melt and many variants of such methods and devices for filtering the polymer melt are known in the prior art. More or less complex or additional apparatuses are thereby required in order to allow the polymer melt to be cleaned in a plurality of process steps. Correspondingly long residence times are thereby required, which promote the risk of formation of decomposition substances.

The object of the invention is to provide a method and a device for cleaning a polymer melt, with which the polymer melt can be cleaned with residence times that are as short as possible.

A further aim of the invention is to allow cleaning of the polymer melt to be carried out with a low outlay in terms of apparatus.

The object is achieved according to a method having certain features disclosed herein and by a device having certain features disclosed herein.

Advantageous further developments are defined by certain features and feature combinations as disclosed herein.

The invention turns away from the conventional separation and sequence of degassing and filtering for cleaning the polymer melt. It has thus been found that the success of a degassing is not dependent on whether foreign substance particles are contained in the polymer melt. On the contrary, the homogeneity of the polymer melt assists with the escape of the volatile foreign substances. The polymer melt is thus pressed through a filter element into a vacuum of a vacuum chamber. The solid foreign substances are taken up by the filter element and the volatile foreign substances are collected in the vacuum chamber. The two process steps for cleaning the polymer melt can thus be combined into one process step.

The device according to the invention comprises for this purpose only a filter element and a vacuum of a vacuum chamber. The cleaning of a polymer melt can thus be carried out in one process step with a low outlay in terms of apparatus. The polymer melt is pressed through the filter element into the vacuum chamber of the vacuum chamber.

In order to be able to carry out a degassing as effectively as possible, the method variant in which the polymer melt is guided within the vacuum chamber at an outlet face of the filter element is particularly advantageous. Thus, depending on the form of the filter element, relatively large melt surfaces can be produced within the vacuum chamber, which assist with the escape of the volatile foreign substances. In addition, the melt surface at the outlet face of the filter element is constantly renewed via the throughflow at the filter element.

The volatile foreign substances escaping from the polymer melt are continuously discharged from the vacuum chamber through a degassing opening. Separation of substances is thus ensured, and the volatile foreign substances can be treated and optionally used separately.

In order to allow the volatile foreign substances to escape from the polymer melt within the vacuum chamber, the vacuum is set at a low pressure in the range from 0.5 mbar to 50 mbar. The low pressure within the vacuum chamber is thereby chosen in dependence on a thickness of the polymer melt at the outlet face of the filter element. A relatively high vacuum is thus generated in order to obtain intensive degassing in the case of relatively thick melt layers.

According to an advantageous further development of the invention, the cleaned polymer melt is collected in a sump of the vacuum chamber formed beneath the filter element and discharged through a melt outlet. A continuous melt flow can be achieved, so that cleaning of the polymer melt can be integrated without problems into an extrusion process.

Feeding of the polymer melt takes place via a melt inlet into a pressure space delimited by the filter element with an excess pressure. The melt throughput at the filter element can thus be adjusted in dependence on the excess pressure.

Depending on the contamination by solid foreign substances, the polymer melt is filtered with a filter fineness of the filter element in the range from 40 μm to 1000 μm. For example, in the production of fine filaments in a melt spinning process, a relatively high filter fineness is required in order to avoid filament breakages.

Depending on the fineness of the filter element, the polymer melt is introduced into the pressure space with the excess pressure in the range from 10 bar to 100 bar.

In order to obtain sufficient flowability of the polymer melt, the polymer melt is heated to a temperature before it is cleaned, depending on the polymer type. The polymer melt is preferably heated to a temperature above 200° C.

In order that a sufficient melt surface can be formed within the vacuum chamber after filtering, use is preferably made of the further development of the device according to the invention in which the filter element is formed at least of a hollow cylindrical filter candle or a filter plate which projects into the vacuum chamber. The outer sides of the filter candle or of the filter plate are thereby used to obtain as large an outer surface as possible for guiding the melt after filtering. The filter elements are thus designed with a filter face on the inlet side which is smaller than an outlet face at which the melt is guided for the purpose of degassing.

For generating the vacuum and for discharging the volatile constituents there is provided the further development of the device according to the invention in which the vacuum chamber is connected via a degassing opening to a collecting container and a vacuum pump.

The vacuum pump is so designed that the vacuum in the vacuum chamber can be generated at a low pressure in the range from 0.5 mbar to 50 mbar.

The cleaned melt is preferably collected in a bottom region of the vacuum chamber. For this purpose there is formed according to an advantageous further development of the invention a sump which extends beneath the filter element and which is connected to a melt outlet in a chamber housing.

The chamber housing additionally has a melt inlet which opens in a pressure space delimited by the filter element. A melt stream of the polymer melt can thus be introduced directly into the pressure space and guided to the filter element.

Depending on the desired degree of cleaning of the polymer melt, the filter element has a filter fineness in the range from 40 μm to 1000 μm. The filter fineness is dependent on the production process or on the product to be produced in a particular case.

For receiving the polymer melt, the melt inlet can advantageously be connected directly to a pressure source by means of which the polymer melt can be introduced into the pressure space with the excess pressure in the range from 10 bar to 100 bar. An extruder or a pump can be used as the pressure source.

For adjusting the temperature of the polymer melt, a heating device is associated with the chamber housing. The polymer melt can thus be maintained at a predetermined temperature before and after cleaning.

The method according to the invention and the device according to the invention are suitable for all extrusion processes in which a polymer melt is processed. In particular, however, polymer melts from a recycling process can also be cleaned thereby.

Figure 2:
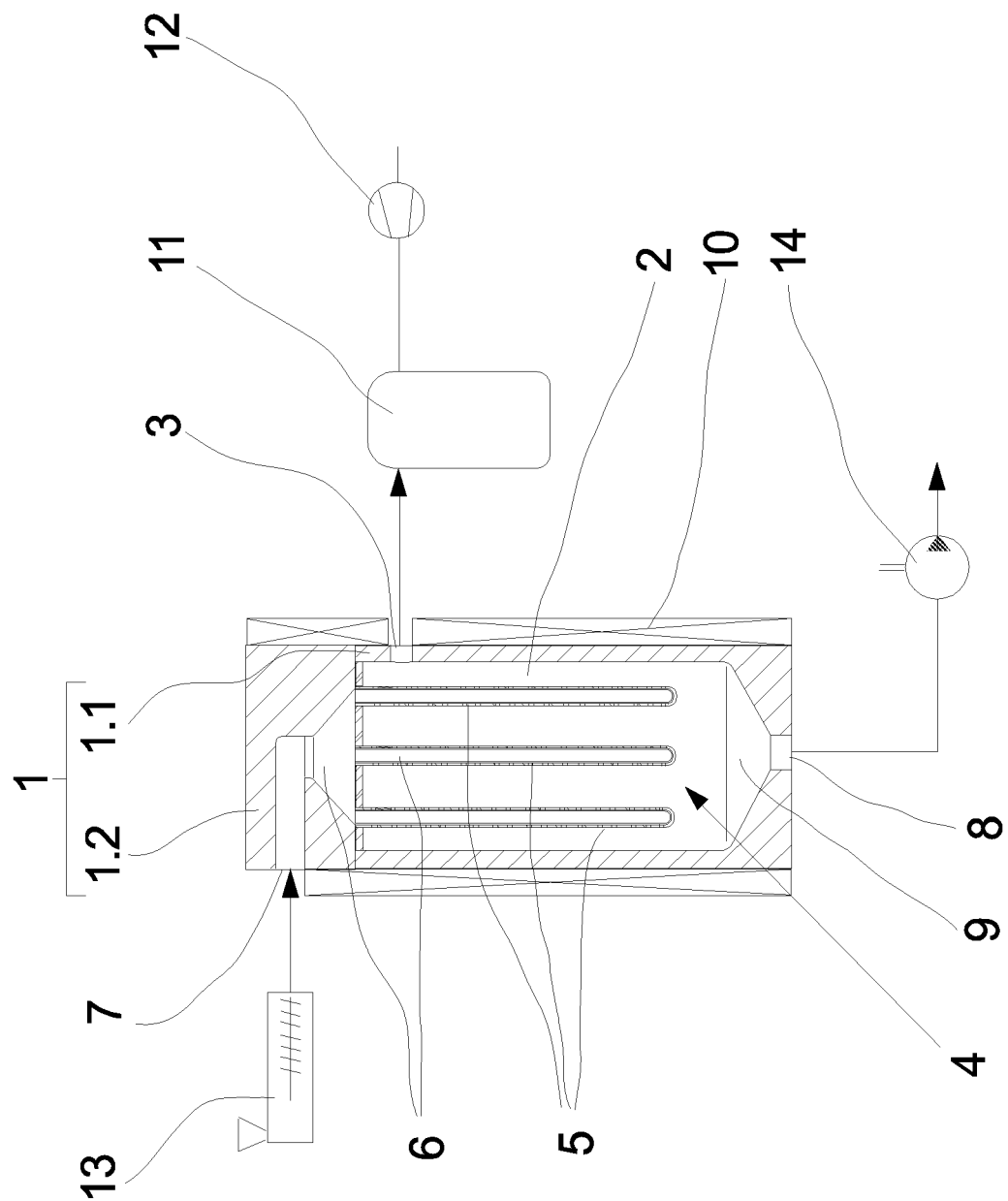
Figure 3:
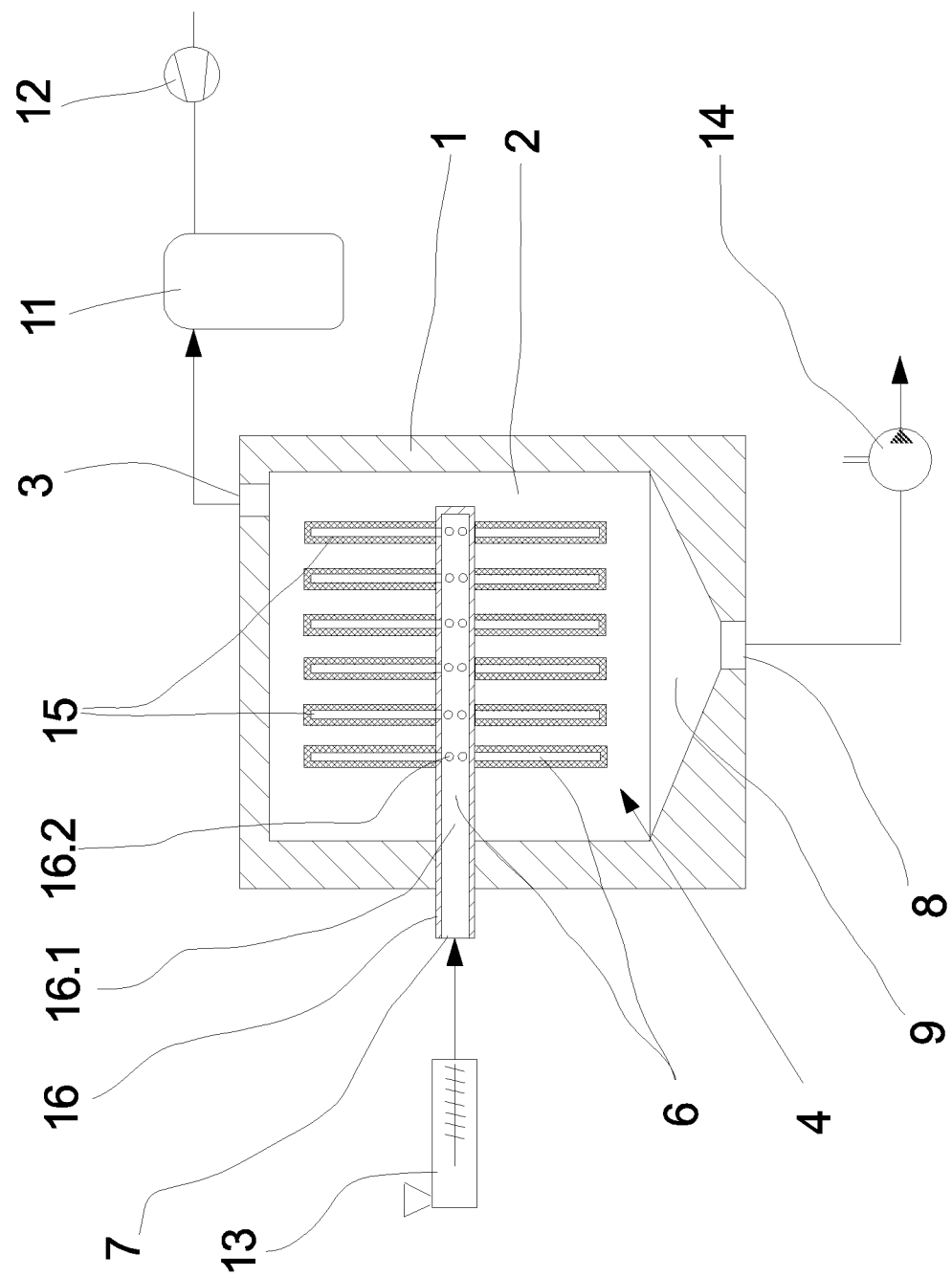
Figure 4:
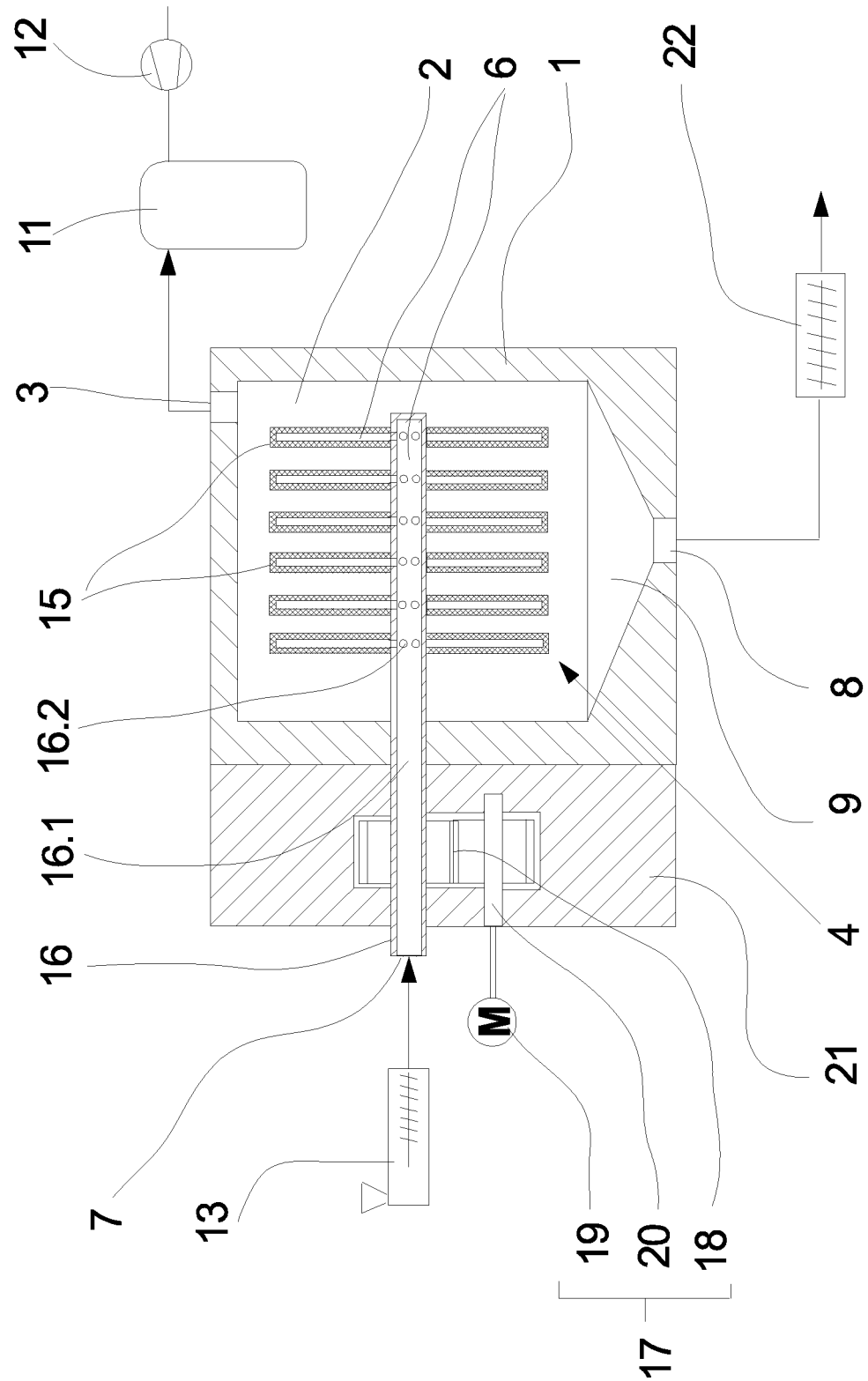

The method according to the invention for cleaning a polymer melt will be described in greater detail hereinbelow by means of some exemplary embodiments with reference to the accompanying figures, in which:

FIG. 1 is a cross-sectional view, in schematic form, of a first exemplary embodiment of the device according to the invention for cleaning a polymer melt FIG. 2 is a cross-sectional view, in schematic form, of a further exemplary embodiment of the device according to the invention for cleaning a polymer melt FIG. 3 shows, in schematic form, a further exemplary embodiment of the device according to the invention for cleaning a polymer melt FIG. 4 shows, in schematic form, a further exemplary embodiment of the device according to the invention for cleaning a polymer melt.

FIG. 1 shows, in schematic form, in a cross-sectional view, a first exemplary embodiment of the device according to the invention for cleaning a polymer melt. The exemplary embodiment comprises a chamber housing 1, which in this example is formed by a cylindrical pot 1.1 and a lid 1.2. The pot 1.1 contains a vacuum chamber 2. Within the vacuum chamber 2, a filter element 4 is held centrally on the pot 1.1. The filter element 4 is in the form of a filter candle 5 and projects into the vacuum chamber 2. The filter candle 5 is in hollow cylindrical form and has on the inside a pressure space 6 which is connected to a melt inlet 7 in the chamber housing 1. The melt inlet 7 is here formed on the lid 1.2. The filter candle 5 is closed at a free end and has on the inside a filter material 5.1 and on the outer periphery a supporting wall 5.2. The supporting wall 5.2 has a plurality of outlet openings 5.3 and forms an outer outlet face for guiding the filtered polymer melt within the vacuum chamber 2.

Beneath the filter element 4, a sump 9 is formed in the vacuum chamber 2 in the bottom of the pot 1.1. The sump 9 is connected to a melt outlet 8 in the chamber housing 1. The melt outlet 8 is arranged centrally in the bottom of the pot 1.1, wherein the sump 9 extends in the manner of a funnel above the melt outlet 8.

The vacuum chamber 2 is connected via a degassing opening 3 in the chamber housing 1 to a collecting container 11 and a vacuum pump 12. In this exemplary embodiment, the degassing opening 3 is formed in the pot 1.1 of the chamber housing 1.

Arranged on the periphery of the chamber housing 1 is a heating device 10. The heating device 10 preferably comprises electric heating means, which are not shown here.

During operation, the melt inlet 7 on the chamber housing 1 is connected to a pressure source 13. In this exemplary embodiment, the pressure source 13 is formed by a pump. By means of the pump 13, the polymer melt can be fed continuously to the melt inlet 7 in the form of a melt stream.

Connected to the melt outlet 8 is a discharge pump 14. The discharge pump 14 discharges the cleaned polymer melt with a continuous discharge stream.

During operation, a vacuum with a low pressure in the range from 0.5 mbar to 50 mbar is first established in the vacuum chamber 2 via the vacuum pump 12. The level of the vacuum in the vacuum chamber 2 is dependent on the process an on the filter elements 4 used in a particular case.

Via the pressure source 13, a polymer melt is fed via the melt inlet 7 to the filter element 4. The polymer melt is thereby fed with an excess pressure in the range from 10 bar to 100 bar. The pressure space 6 within the filter candle 5 is thereby filled, so that the polymer melt is pressed through the filter material 5.1 for filtering. The solid foreign substances are taken up by the filter material 5.1 in dependence on the filter fineness. The polymer melt then passes through the outlet openings 5.3 in the supporting wall 5.2. The polymer melt adheres at the outlet face of the supporting wall 5.2 of the filter candle 5 and slides under the effect of gravity within the vacuum chamber in the direction towards the sump 9. The polymer melt guided at the outlet face of the supporting wall 5.2 forms a jacket-like melt surface within the vacuum chamber 2, which melt surface is directly exposed to the vacuum. The volatile foreign substances are thereby removed from the polymer melt and collected within the vacuum chamber 2. The volatile foreign substances are discharged via the degassing opening 3 and received in the collecting container 11. Within the collecting container 11, the volatile foreign substances can be treated and, for example, separated into gaseous and liquid media.

The cleaned polymer melt which collects in the sump 9 is discharged via the melt outlet 8. For generating a continuous melt stream, the discharge pump 14 is connected to the melt outlet 8, so that a continuous melt stream can be generated. It is thereby possible for a level sensor to be arranged within the vacuum chamber 2, which sensor cooperates with a pump controller in such a manner that a substantially constant melt throughput is ensured. The pump controller can thereby act on the pressure source or on the discharge pump or on both.

For temperature control, the heating device 10 is provided at the periphery of the chamber housing 1. The heating device 10, which preferably comprises electric heating means, ensures a melt temperature above 200° C. Temperatures up to 330° C. may be required in order to keep the polymer melt at a controlled temperature. These are governed substantially by the polymer type of the polymer melt to be cleaned.

The method according to the invention and the device according to the invention are suitable in principle for all thermoplastic melts. By means of combined filtering and degassing, cleaning of the polymer melt can be carried out with relatively short residence times.

In order to permit a higher melt throughput, as can be generated, for example, by extruders, FIG. 2 shows, in schematic form, in a cross-sectional view, a further exemplary embodiment of the device according to the invention. The exemplary embodiment is substantially identical to the above-mentioned exemplary embodiment according to FIG. 1, so that only the differences will be discussed at this point and otherwise reference is made to the above-mentioned description.

In the exemplary embodiment according to FIG. 2, a plurality of filter elements 4 is provided, which project in a protruding manner into a vacuum chamber 2. In this exemplary embodiment, three filter candles 5 are arranged side by side in parallel and are connected to the melt inlet 7 and the pressure space 6. The number of filter elements 4 is by way of example. In principle, a large number of filter elements in the range from 100 to 150 can be used in order to carry out combined filtering and degassing for cleaning the polymer melt.

In the exemplary embodiment according to FIG. 2, each filter candle 5 has the same construction as and is designed according to the exemplary embodiment according to FIG. 1. In this respect, reference is made to the above-mentioned description in this connection.

In this exemplary embodiment, the degassing opening 3 is formed in the upper region of the vacuum chamber 2 in the pot 1.1 of the chamber housing 1. Connected to the degassing opening 2 are a collecting container 11 and a vacuum pump 12.

Beneath the free ends of the filter elements 4, a sump 9 is formed in the vacuum chamber 2. The sump 9 is connected to a melt outlet 8.

In the exemplary embodiment shown in FIG. 2, a pressure source 13 in the form of an extruder is provided. In this respect, an outlet side of the extruder is connected directly to the melt inlet 7 of the cleaning device.

The function of the exemplary embodiment shown in FIG. 2 is identical to that of the exemplary embodiment according to FIG. 1, so that no further explanation thereof will be given at this point.

When forming the filter elements 4, the outlet faces provided by the filter elements are always made larger than a filter face for filtering the polymer melt. The polymer melt is thus pressed from the inside outwards at the filter candles 5, wherein the outlet faces at the periphery of the filter candles 5 generate the melt surfaces for degassing. In principle, filter elements other than filter candles are suitable for allowing combined filtering and degassing to be carried out. FIG. 3 shows a further exemplary embodiment in which the filter elements are formed by filter plates.

FIG. 3 shows, in schematic form, in a cross-sectional view, a further exemplary embodiment of the device according to the invention. The exemplary embodiment shown in FIG. 3 comprises a chamber housing 1 in which a vacuum chamber 2 is formed. The vacuum chamber 2 is connected via a degassing opening 3 to a collecting container 11 and a vacuum pump 12.

Within the vacuum chamber 2 there is arranged a plurality of filter elements 4. In this exemplary embodiment, the filter elements 4 are formed by filter plates 15, which are held on the periphery of a rod 16. The rod 16 forms a melt channel 16.1 on the inside, which is connected via a plurality of distribution openings 16.2 to a pressure space 6 of each of the filter plates 15. The rod 16 passes through the chamber housing 1 to the outside and forms a melt inlet 7 at an open end.

Within the vacuum chamber 2, a sump 9 is formed beneath the vertically oriented filter plates. The sump 9 is funnel-shaped and is connected to a lower melt outlet 8 in the chamber housing 1. The melt outlet 8 and the degassing opening 3 are located opposite one another in the vacuum chamber 2 in this exemplary embodiment.

During operation, the melt inlet 7 can be connected directly to an extruder as the pressure source 13. In this respect, the polymer melt is guided via the melt channel 16.1 and the distribution opening 16.2 into the pressure spaces 6 of the filter plates 15. The filter plates 15 comprise a filter material for filtering the solid foreign substances out of the polymer melt. The filter material can have a filter fineness in the range from 40 μm to 1000 μm. After the polymer melt has passed through the filter material on the filter plate 15, the polymer melt reaches the outlet faces of the filter plates 15, wherein a melt surface of the polymer melt forms within the vacuum chamber at each of the filter plates 15. The polymer melt then passes, due to the force of gravity, to the sump 9 in the bottom of the vacuum chamber 2. During this time, degassing of the polymer melt is carried out. The volatile foreign substances that escape thereby are fed via the degassing opening 3 to the collecting container 11. The vacuum established by the vacuum pump 12 is in a range from 0.5 mbar to 50 mbar. The cleaned polymer melt is conveyed in a continuous melt stream out of the vacuum chamber 2 by the discharge pump 14 via the melt outlet. At higher throughput rates, the polymer melt could alternatively also be conveyed by a discharge extruder.

In the exemplary embodiment shown in FIG. 3, the heating device 10 for controlling the temperature of the chamber housing 1 has not been shown in detail. Likewise, the number of filter plates shown is by way of example. In principle, a larger number of filter plates can also be used for the combined filtering and degassing of the polymer melt.

In order to improve the formation of melt surfaces, an alternative exemplary embodiment of the device according to the invention is shown in FIG. 4. The exemplary embodiment according to FIG. 4 is substantially identical to the exemplary embodiment according to FIG. 3, so that only the differences will be discussed hereinbelow and otherwise reference is made to the above-mentioned description relating to FIG. 3.

In the exemplary embodiment shown in FIG. 4, a drive housing 21 is arranged next to the chamber housing 1. The rod 16 passes through the drive housing 21, wherein at a closed end the rod 16 holds a plurality of filter plates 15 within a vacuum chamber 2 and wherein a free end of the rod 16 outside the drive housing 21 forms a melt inlet 7. Within the drive housing 21, the rod 16 is rotatably mounted and is coupled via a gearwheel pairing 18 with a drive shaft 20. The drive shaft 20 is connected to a motor 19. Via the motor 19, the rod 16 can thus be set in rotation, so that the filter plates 15 held within the vacuum chamber 2 rotate with a predetermined circumferential speed. A melt layer forming at the outlet faces of the filter plates 15 is thus moved, which assists with the renewal of the melt surface.

In the exemplary embodiment according to FIG. 4, a discharge extruder 22 is connected to the melt outlet 8 of the chamber housing 1. The discharge extruder 22 is shown in a horizontal arrangement, in order to continuously convey the cleaned polymer melt. In principle, the discharge extruder 22 could also be held in a vertical arrangement, in order to generate a continuous melt stream of the cleaned polymer melt.

The function for cleaning the polymer melt by combined filtering and degassing is identical in the exemplary embodiment according to FIG. 4 to the exemplary embodiment according to FIG. 3. In that respect, reference is made to the above-mentioned description relating to FIG. 3.

In the exemplary embodiments shown in FIGS. 1 to 4 of the device according to the invention for cleaning the polymer melt, the arrangement and the choice of the filter elements are by way of example. The filter candles that are shown according to FIGS. 1 and 2 can thus also be held in a different installation position in the vacuum chamber. Vertical, horizontal or angled installation positions are possible. Moreover, the filter elements are preferably removable, in order to remove the solid foreign substances from the filter elements.

Likewise, extruders or pumps as pressure means as well as discharge pumps and discharge extruders on the outlet side can be combined with one another in any desired manner in the exemplary embodiments shown according to FIG. 1 to FIG. 4.

The invention claimed is:

1. A method for cleaning a polymer melt, in which volatile foreign substances and solid foreign substances are removed from the polymer melt,
wherein the polymer melt is pressed through a filter element into a vacuum of a vacuum chamber in one process step,
wherein the solid foreign substances are taken up by the filter element,
wherein the volatile foreign substances are collected in the vacuum chamber, and
wherein the filter element comprises at least one filter candle or a filter plate which is held in the vacuum chamber at least in a projecting manner.

2. The method as claimed in claim 1, wherein the polymer melt is guided within the vacuum chamber at an outlet face of the filter element.

3. The method as claimed in claim 1, wherein the volatile foreign substances are discharged from the vacuum chamber through a degassing opening.

4. The method as claimed in claim 1, wherein the vacuum in the vacuum chamber is adjusted to a low pressure in the range from 0.5 mbar to 50 mbar.

5. The method as claimed in claim 1, wherein the polymer melt is collected in a sump of the vacuum chamber formed beneath the filter element and is discharged through a melt outlet.

6. The method as claimed in claim 1, wherein the polymer melt is introduced via a melt inlet into a pressure space delimited by the filter element with an excess pressure.

7. The method as claimed in claim 6, wherein the polymer melt is filtered with a filter fineness of the filter element in the range of from 40 µm to 1000 µm.

8. The method as claimed in claim 7, wherein the polymer melt is introduced into the pressure space with an excess pressure in the range from 10 bar to 100 bar.

9. The method as claimed in claim 1, wherein the polymer melt is heated to a temperature above 200° C. before it is cleaned.

10. A device for cleaning a polymer melt, with which volatile foreign substances and solid foreign substances can be removed from the polymer melt, the device comprising:
a filter element and
a vacuum of a vacuum chamber,
wherein the polymer melt can be guided through the filter element into the vacuum of the vacuum chamber in one process step,
wherein the filter element binds the solid foreign substances,
wherein the vacuum chamber receives the volatile foreign substances, and
wherein the filter element comprises at least one filter candle or a filter plate which is held in the vacuum chamber at least in a projecting manner.

11. The device as claimed in claim 10, wherein the vacuum chamber is connected via a degassing opening to a collecting container and a vacuum pump.

12. The device as claimed in claim 11, wherein the vacuum in the vacuum chamber can be generated by the vacuum pump at a low pressure in the range from 0.5 mbar to 50 mbar.

13. The device as claimed in claim 10, wherein a sump is formed beneath the filter element in a bottom region of the vacuum chamber, which sump is connected to an melt outlet in a chamber housing.

14. The device as claimed in claim 13, wherein the chamber housing has a melt inlet which opens into a pressure space delimited by the filter element.

15. The device as claimed in claim 10 wherein the filter element has a filter fineness in the range from 40 µm to 1000 µm.

16. The device as claimed in claim 14, wherein the melt inlet can be connected to a pressure source by means of which the polymer melt can be introduced into the pressure space with an excess pressure in the range from 10 bar to 100 bar.

17. The device as claimed in claim 10, wherein a heating device for controlling the temperature of a chamber housing is provided.

* * * * *